Jan. 16, 1934.                M. VOGEL                1,944,020
                              ENVELOPE
                          Filed July 30, 1932
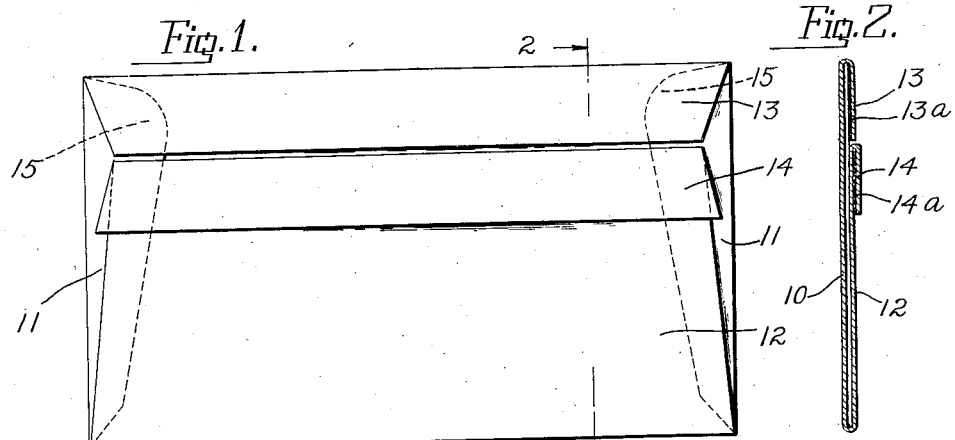
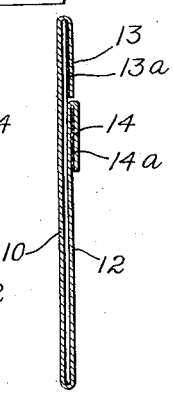
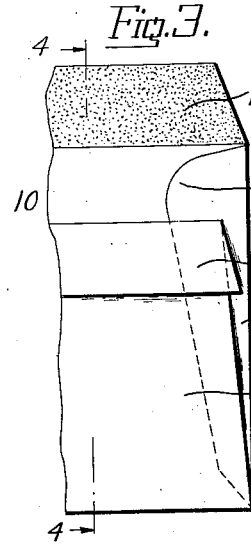
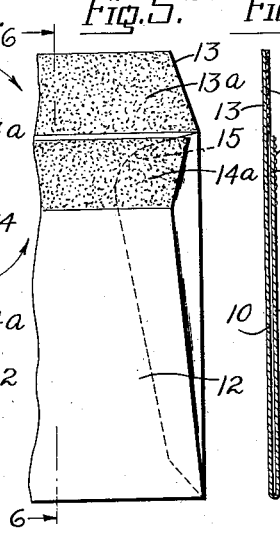
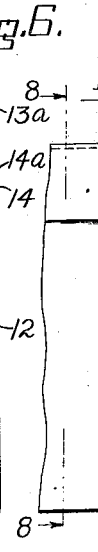
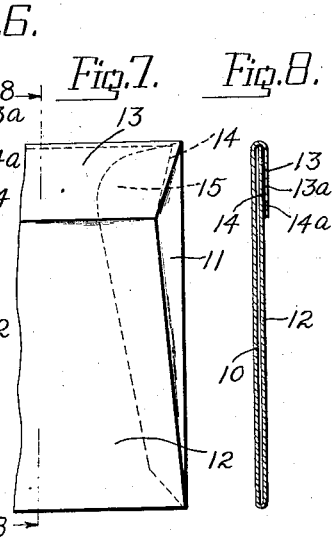
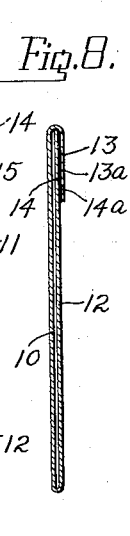
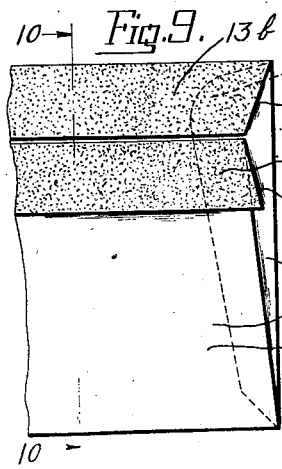
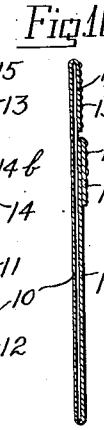
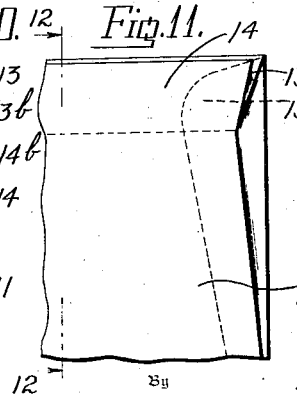
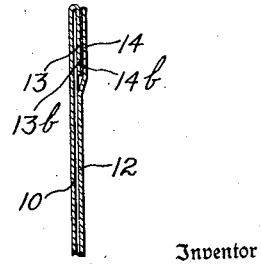
Inventor
Max Vogel
By
Attorney Patented Jan. 16, 1934

1,944,020

UNITED STATES PATENT OFFICE 1,944,020

ENVELOPE

Max Vogel, Frankfort-on-the-Main, Germany

Application July 30, 1932, Serial No. 626,673, and in Germany May 21, 1932

7 Claims. (Cl. 229—82)

REISSUED

The present invention relates to envelopes in which cooperating adhesive surfaces are provided on the flap and on a portion of the body of the envelope, the two adhesive surfaces being brought together in closing the flap to thus seal the envelope. The adhesive is of a type which will preferably not stick on the paper itself, even when moistened, but will firmly stick to the same adhesive substance, a suitable substance of this character being a solution of para rubber in gasoline. For convenience this substance because of its property of adhering to itself without the necessity of moistening it, will hereinafter be referred to as dry-adhesive.

Envelope structure heretofore in use were unsatisfactory for the use of such cooperating adhesive surfaces, particularly because of the fact that the adhesive surfaces would be apt to stick together prematurely, would be exposed to dust when they were out of contact with each other, and it was not possible to stack the envelopes or run them in a printing press or typewriter, without likelihood of the surfaces becoming stuck together.

It is proposed in the present invention to provide an envelope structure in which the adhesive surfaces will be protected from contact with each other before use, while at the same time they will be protected from exposure. Another object is to provide a structure which will facilitate insertion of enclosures into the envelope. A further object is to provide a structure which will protect the enclosures against the possibility of accidental cutting by a letter-opener.

With the above and other objects in view embodiments of the invention are shown in the accompanying drawing and these embodiments will be hereinafter more fully described with reference thereto, and the invention will be finally pointed out in the claims.

In the drawing:

Fig. 1 is a plan view of the rear side of an envelope according to one illustrated exemplary embodiment of the invention, the same being shown in its unsealed relation.

Fig. 2 is a sectional view along the line 2—2 of Fig. 1.

Fig. 3 is a fragmentary plan view with the top sealing flap raised preparatory to inserting an enclosure.

Fig. 4 is a sectional view taken along the line 4—4 of Fig. 3.

Fig. 5 is a fragmentary plan view showing both the upper and lower closing flaps raised preparatory to sealing.

Fig. 6 is a sectional view taken along the line 6—6 of Fig. 5.

Fig. 7 is a fragmentary plan view showing the flaps closed and sealed.

Fig. 8 is a sectional view, taken along the line 8—8 of Fig. 7.

Fig. 9 is a fragmentary plan view of a modified form of the invention, and showing the envelope in its unsealed relation.

Fig. 10 is a sectional view, taken along the line 10—10 of Fig. 9.

Fig. 11 is a fragmentary plan view, showing the envelope sealed.

Fig. 12 is a sectional view, taken along the line 12—12 of Fig. 11.

Similar reference characters indicate corresponding parts throughout the several figures of the drawing.

Referring to the drawing, and more particularly to the exemplary embodiment of the invention illustrated in Figs. 1 to 8, the envelope comprises a front or address-side portion 10, side flaps 11—11 bent inwardly from the side edges of the portion 10, and a back portion 12, suitably secured, as by the usual pasting methods, to the side flaps. A closing flap 13 is provided at the upper edge of the front portion 10, and another closing flap 14 is provided at the upper edge of the back portion 12, the fold of the flap 14 being parallel to and slightly spaced from or substantially coinciding with the lower edge of the flap 13, and the upper edge of said flap 14 adapted in the closed position to extend into closely contiguous or adjacent relation to the fold of said flap 13. A strip of dry-adhesive 13ª is provided on the inner side of the flap 13, and a similar strip of dry adhesive 14ª is provided on the inner side of the flap 14. Before use and when stacked the closing flap 13 is folded down into the space left by the folding down of the flap 14, as shown in Figs. 1 and 2, so that both adhesive surfaces are inside and concealed from dirt and dust, and are out of contact with each other. The envelope may thus be printed upon, inserted in a typewriter, sorted and otherwise handled as an ordinary envelope, as no portion carrying the dry adhesive substance is exposed, or disposed in such relation as to prematurely contact the adhesive strips.

In inserting an enclosure both the flaps 13 and 14 may be grasped, thus widening the opening for more convenient insertion of the enclosure than with the ordinary type of envelope. Thereupon the flap 14 is folded up and the flap 13 folded down upon it, as indicated by the arrows Fig. 4. In this latter relation, as shown in Figs. 7 and 8, the dry-adhesive strips contact each other and by a slight pressure applied to the outer side of the flap 13 are cementitiously joined to each other.

For facilitating the opening of the envelope by a letter opener, and at the same time prevent the cutting of the enclosures by the action of the opener, the side flaps 11 preferably have ears 15, at their upper ends, which fasten under the adhesive strips, and thus deflect the opener from the edge of the letter, and at the same time permit the opener to be conveniently inserted because of the fact that the dry adhesive does not adhere to these ears and therefore provides a small slot or space for entrance of the tip of the opener.

The side edges of the back 12, the side flaps 11—11, and the flaps 13 and 14 are preferably cut diagonally, but obviously may be otherwise suitably arranged.

In Figs. 9 to 12, I have illustrated a modification in which dry-adhesive strips 13$^b$ and 14$^b$ are provided on the outsides of the respective flaps 13 and 14. In closing the envelope after inserting an enclosure, the closing flap 13 is first folded down, and the flap 14 is then folded over it as shown in Figs. 11 and 12. For printing and for stacking the flap 14 may be raised up, so that the adhesive strip is inside. Also the flap 13 may be folded upon the front of the envelope, so that both adhesive strips are concealed and at the same time are out of contact with each other.

I have illustrated and described a preferred and satisfactory embodiment of the invention, but it will be obvious that changes may be made therein, within the spirit and scope thereof as defined in the appended claims.

Having thus described my invention what I claim and desire to secure by Letters Patent is:—

1. In an envelope, front and back portions, a pair of closing flaps foldable relatively to said front and back portions and each having an adhesive substance upon one surface, the adhesive substance upon one of said flaps adapted to adhere to the adhesive substance upon the other flap upon contact therewith.

2. In an envelope, front and back portions having flaps at the upper edge, the upper edge of one portion being below the upper edge of the other, said flaps adapted to be folded into superimposed relation to close the envelope, and each having an adhesive substance upon one surface, the adhesive substance upon one of said flaps adapted to adhere to the adhesive substance upon the other flap upon contact therewith.

3. In an envelope, front and back portions having flaps at the upper edges, the upper edge of one portion being below the upper edge of the other, to an extent at least equal to the width of the flap of the said other portion, said flaps adapted to be folded into superimposed relation to close the envelope and each having an adhesive substance upon one surface, the adhesive substance upon one of said flaps adapted to adhere to the adhesive substance upon the other flap upon contact therewith.

4. In an envelope, front and back portions, a foldable closing flap carried by said front portion; a second foldable closing flap carried by said back portion, an adhesive substance on one side of each of said flaps, the adhesive substance upon one of said flaps adapted to adhere to the adhesive substance upon the other flap upon contact therewith, said flaps adapted in one position to lie flat upon said front and back portions respectively with the adhesive surfaces out of contact with each other, and with one flap in the other position to be superimposed upon each other with the adhesive surfaces contacting.

5. In an envelope, front and back portions, a foldable closing flap carried by said front portion; a second foldable closing flap carried by said back portion, an adhesive substance on one side of each of said flaps, the adhesive substance upon one of said flaps adapted to adhere to the adhesive substance upon the other flap upon contact therewith, said flaps adapted in one position to lie flat upon said front and back portions respectively with the adhesive surfaces out of contact with each other and disposed inwardly against the envelope surface to conceal them, and with one flap in the other position to be superimposed upon each other with the adhesive surfaces contacting.

6. In an envelope, front and back portions having flaps at the upper edges, the upper edge of one portion being below the upper edge of the other, to an extent at least equal to the width of the flap of the said other portion, said flaps adapted to be folded into superimposed relation to close the envelope and each having an adhesive substance upon one surface, the adhesive substance upon one of said flaps adapted to adhere to the adhesive substance upon the other flap upon contact therewith, and side flaps on one of said portions secured to the under side of the other portion and having portions extending into the spaces between said upper edges, to deflect a letter opener inserted between said side flaps and said flap on the upper edge of said back portion away from the contents of the enclosure.

7. In an envelope, front and back portions, a pair of foldable flaps on the upper edges of said portions, an adhesive substance upon one side of one of said flaps, an adhesive substance disposed and concealed between the second flap and the outer surface of the envelope in one position of said flap and adapted to be exposed in the other position of said flap, said first-mentioned adhesive substance adapted to adhere to said second-mentioned adhesive substance upon contact therewith, said flaps adapted in one position to lie in substantially parallel relation to said front and back portions and below the respective upper edges thereof with said adhesive substances out of contact with each other, and with said second flap in its said other position to expose said second-mentioned adhesive substance to superimposition of said other flap thereon with said first-mentioned adhesive substance contacting with said second-mentioned adhesive substance.

MAX VOGEL.